United States Patent [19]
Schulz

[11] Patent Number: 5,562,399
[45] Date of Patent: Oct. 8, 1996

[54] AUTOMATIC MAIL STACKER

[75] Inventor: Kenneth A. Schulz, Bethel, Conn.

[73] Assignee: Pitney Bowes Inc., Stamford, Conn.

[21] Appl. No.: 327,775

[22] Filed: Oct. 24, 1994

[51] Int. Cl.6 .................................................... B65G 57/30
[52] U.S. Cl. ............................ 414/795; 414/900; 271/2;
271/250; 271/171
[58] Field of Search .............................. 271/2, 207, 145,
271/171, 250; 414/900, 794.9, 795, 795.1;
221/75

[56] References Cited

U.S. PATENT DOCUMENTS

| | | | |
|---|---|---|---|
| 3,712,487 | 1/1973 | Eberle | 414/795.1 |
| 4,378,938 | 4/1983 | Staniszewski | 414/795.1 |
| 4,382,592 | 5/1983 | Harding et al. | 271/207 |
| 4,720,230 | 1/1988 | Johnson et al. | 414/797.9 |
| 5,092,579 | 3/1992 | Tokoro et al. | 271/240 |
| 5,112,037 | 5/1992 | Holbrook | 271/2 |
| 5,429,349 | 7/1995 | Supron et al. | 414/795.1 |

Primary Examiner—Karen B. Merritt
Assistant Examiner—Gregory A. Morse
Attorney, Agent, or Firm—Lawrence E. Sklar; Melvin J. Scolnick

[57] ABSTRACT

A stacker for stacking paper documents seriatim is disclosed. The stacker includes: a platform, a helix extending upwardly from the platform; and a device for rotating the helix, whereby a paper document placed at the bottom of the helix can be driven upwardly to the top of the helix.

6 Claims, 3 Drawing Sheets

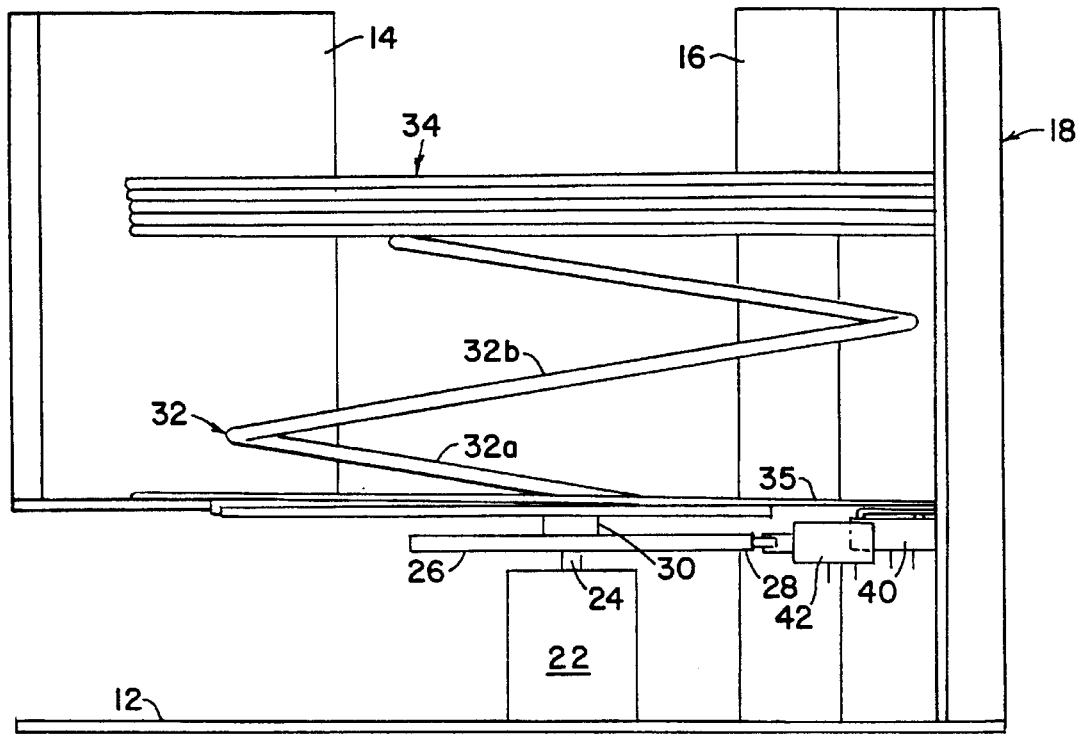
FIG. 3
FIG. 4
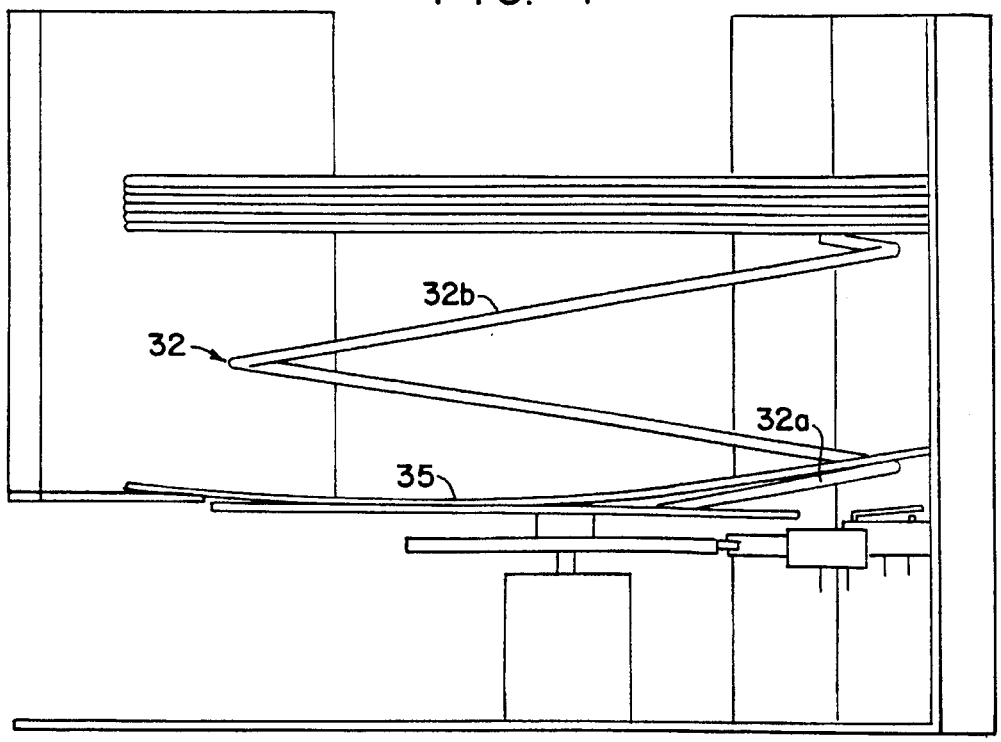

AUTOMATIC MAIL STACKER

BACKGROUND OF THE INVENTION

The instant invention relates to apparatus for stacking of documents, and more particularly to an automatic stacker for stacking filled envelopes which may carry ink on their surfaces that has not completely dried.

Stacking devices are well known for taking singulated items and forming them into stacks or columns. Stackers are commonly used in conjunction with mailing machines, folders, folder/sealers, small envelope inserting devices, mail openers, envelope printers and labelers. In many of these applications, such as mailing machines and envelope printers, an envelope is imprinted with an address and then immediately fed into a stacker. Because the printing devices applying the ink to the envelopes are able to operate at speeds previously not attainable (because of new technologies, such as ink jet and laser jet printing), the ink on the envelope is not always dry as it enters the stacker. Failure of the ink to dry enables a successive envelope to smear the ink on the previous envelope in the stacker.

Accordingly, the instant invention provides an automatic stacker that can function autonomously and can be used with mailing machines, folders, folder/sealers, small envelope inserting devices, mail openers, envelope printers, labelers, etc. The automatic stacker of the instant invention accumulates paper documents or envelopes into a compact stack and prevents successive documents or envelopes from wiping over previous documents or envelopes so that printed matter will not be smeared. Moreover, the automatic stacker of the instant invention extends drying time for printed documents or envelopes before they contact the stack.

SUMMARY OF THE INVENTION

Accordingly, the instant invention provides a stacker for stacking paper documents seriatim. The stacker comprises: a platform; a helix extending upwardly from the platform; and a device for rotating the helix, whereby a paper document placed at the bottom of the helix can be driven upwardly to the top of the helix.

BRIEF DESCRIPTION OF THE DRAWINGS

FIG. 3 is a front, elevational view of the stacker seen in FIG. 1 showing the helix in the starting position;

FIG. 4 is similar to FIG. 3 but shows the helix having been rotated 90 degrees from the starting position;

DETAILED DESCRIPTION OF THE PREFERRED EMBODIMENT

Figure 1:
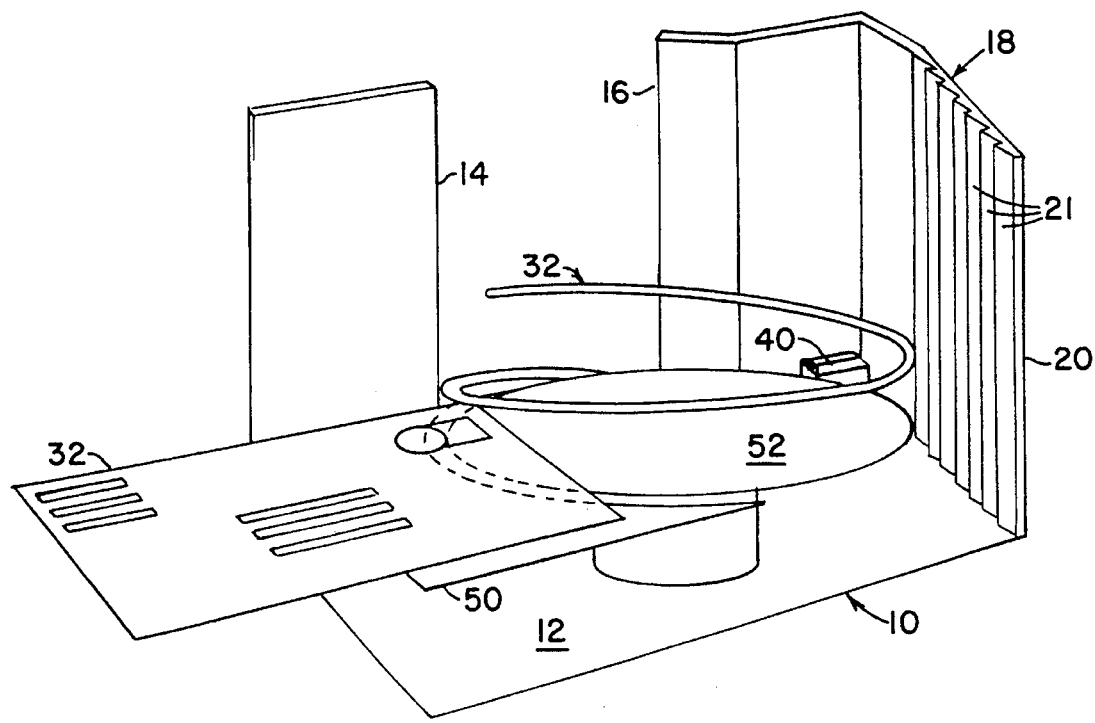
FIG. 1 is a perspective view of an envelope stacker in accordance with the instant invention.
Figure 2:
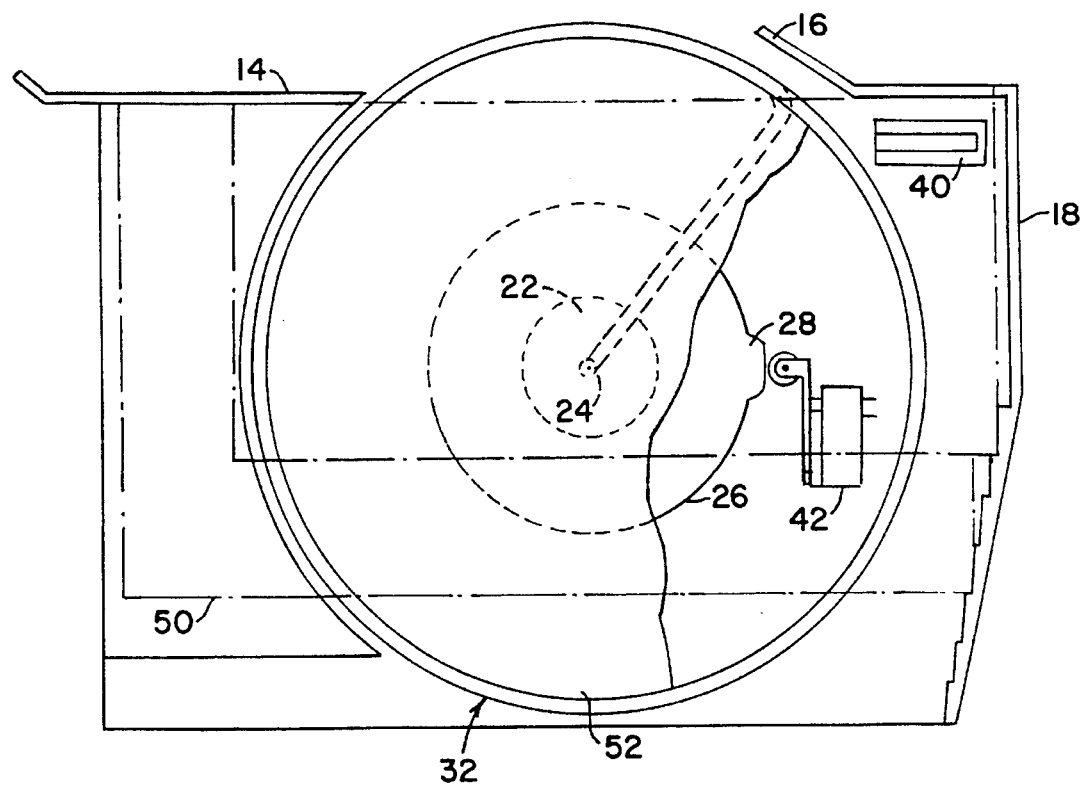
FIG. 2 is a top, plan view of the stacker seen in FIG. 1.

In describing the preferred embodiment of the instant invention, reference is made to the drawings, wherein there is seen an automatic stacker generally designated 10 having a base platform 12. A pair of guide walls 14 and 16 extend upwardly from a side of the platform 12 and an end wall 18 extends upwardly from the back of the platform 12 and is secured to the guide wall 16. The end wall 18 includes an angled, stepped section 20 to be discussed in further detail hereinbelow. As seen in FIGS. 1 and 2, the angled section 20 includes a plurality of vertically extending sections 21 which are offset with respect to each other.

Located beneath the platform 12 is a motor 22 (see FIG. 3) which drives a drive shaft 24 clockwise. A cam 26 is fixedly secured to the drive shaft 24 and includes a camming surface 28. A second shaft 30 extends through the platform 12 and supports a wireform helix 32 having a lower turn 32a and an upper turn 32b, each of the turns 32a and 32b consisting of 360 degrees, so that the total helix 32 includes 720 degrees. The helix 32 is of a gauge heavy enough to support a stack 34 of envelopes 35, and may comprise two or more turns, at a pitch of 2–5 cm., depending on the application. The helix 32 rotates clockwise on its principal axis, driven by the motor 22.

Located above the platform 12 and extending from the guide wall 14 is a guide deck 50 which is substantially adjacent the lower turn 32a of the helix 32 and which functions to guide an envelope 35 onto the bottom of the helix 32 and not beneath the helix 32.

The stacker 10 includes a first snap-action switch 40 (see FIG. 2) and a second snap-action switch 42 which function as limit snap-action switches to control the activation of the motor 22. The first snap-action switch 40 is normally open and becomes closed when an envelope 35 enters the stacker 10 and lands on the snap-action switch 40 and closes the contacts. When closed, the snap-action switch 40 provides starting current for the motor 22. The second snap-action switch 42 is operated by the cam 26 and its contacts are normally closed to provide current to the motor 22. In the home position of the helix 32, seen in FIG. 3, the camming surface 28 interrupts power to the motor 22.

Figure 5:
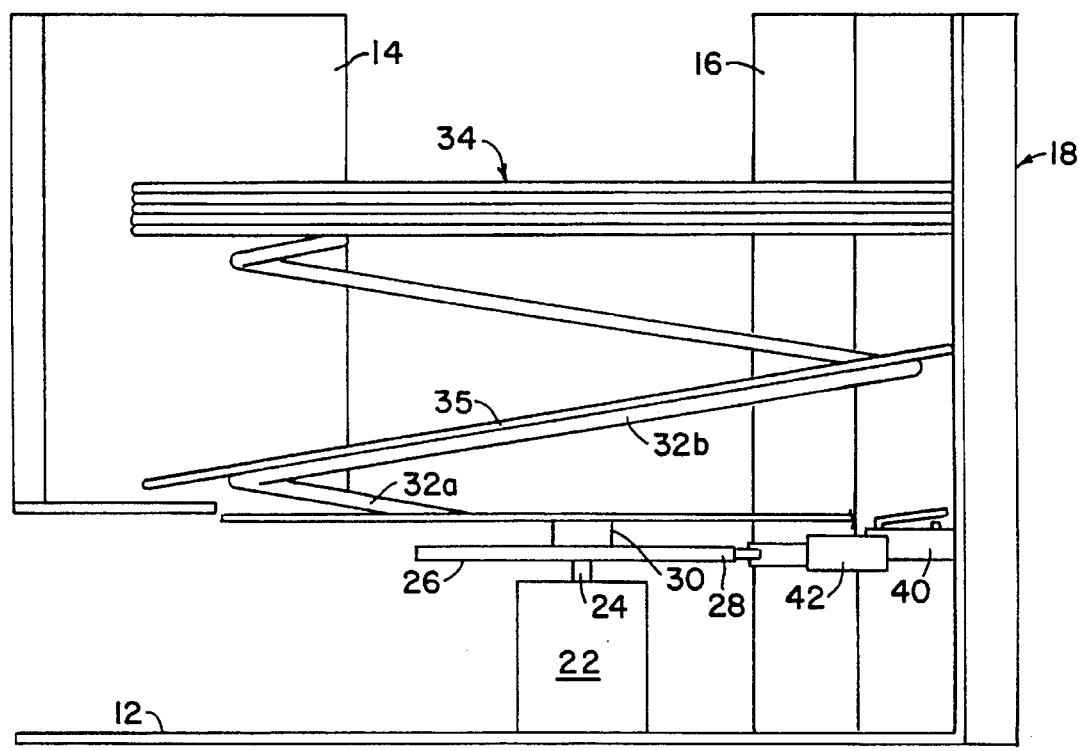
FIG. 5 is similar to FIG. 4 but shows the helix having been rotated 270 degrees from the starting position.
Figure 6:
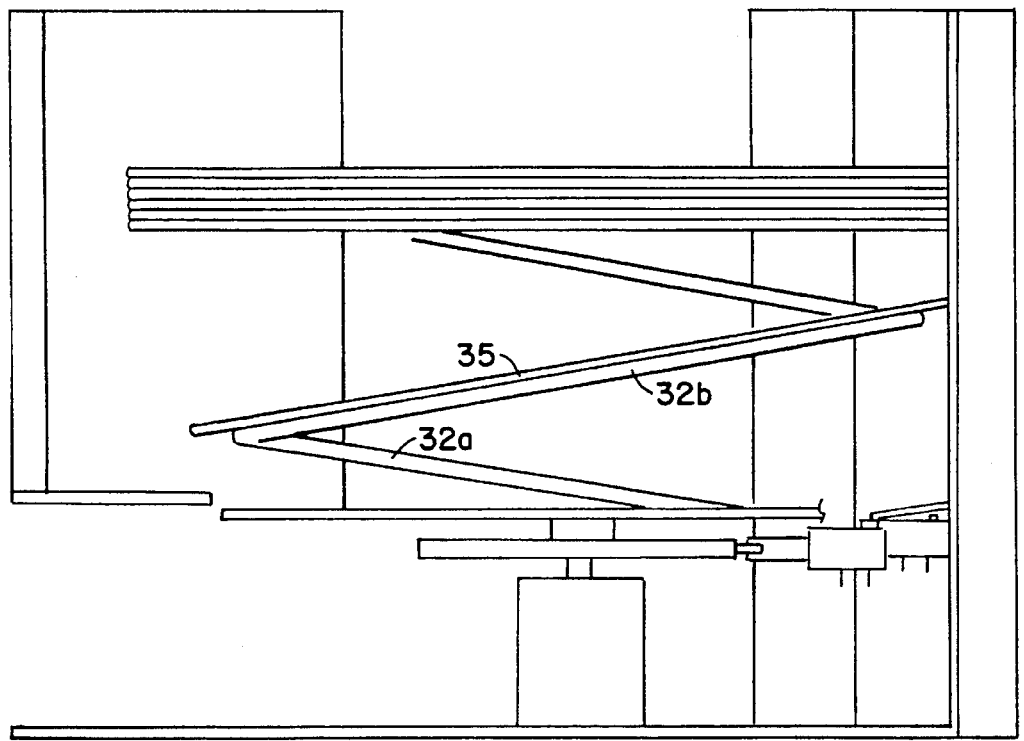
FIG. 6 is similar to FIG. 5 but shows the helix having been rotated 360 degrees from the starting position.

When an envelope 35 enters the stacker 10, it lands on the lowermost turn of the helix 32. This turn may be closed by a flat disk 52 (see FIG. 1) as a supporting surface for the envelope 35. Alternatively, the supporting surface might be cantilevered (not shown) from a fixed part of the stacker 10 so that it does not rotate. When an envelope 35 enters the stacker 10, it also closes the contacts of the first snap-action switch 40, thereby actuating the snap-action switch 40 and starting the motor 22 which causes the helix 32 to begin its clockwise rotation (see FIG. 3). The cam 26 is also caused to rotate clockwise which releases the second snap-action switch 42 whose normally closed contacts provide a second current path for power to the motor 22. The envelope 35 is restrained from turning with the helix 32 by the guide walls 14 and 16 and the stepped end wall 18. Held in the coil of the helix 32, which operates as an Archimedes screw, the envelope 35 is driven upward in the stacker 10. As the envelope 35 moves up, its weight is taken off the first snap-action switch 40, which causes the contacts of the snap-action switch 40 to open. However, the circuit for the motor 22 is still closed and complete through the second snap-action switch 42; thus, the helix 32 continues to drive the envelope 35 upward. When the helix 32 has rotated 90 degrees, the envelope 35 is driven upward to the position seen in FIG. 4. When the helix has rotated 270 degrees, the envelope 35 is driven further upward to the position seen in FIG. 5, and when the helix 32 has completed one turn, the envelope 35 is driven further upward to the position seen in FIG. 6, at which point the camming surface 28 opens the normally closed contacts of the second snap-action switch 42 and stops the motor 22. At this point, the envelope 35 has been driven upward through the lower turn 32a of the helix 32, but not upward through the upper turn 32b.

Now the stacker 10 is ready to accept another envelope 35. The same sequence of events described above will occur again, and the old envelope 35 will end up atop the helix 32 immediately underneath the previous envelope 35, and form the stack 34. It can be seen that the helix 32 must undergo two rotations for an envelope 35 to be driven upward through the turns 32*a* and 32*b* of the helix 32. The foregoing cycle may be repeated until the stacker 10 is filled; the operator may then remove the stack 35.

In addition to the use of the guide walls 14 and 16 and the stepped end wall 18 to control the stack 35, the helix 32 may be tilted so that gravity aids in proper stacking. A slightly more elaborate stacker could employ a pair of helixes in counter-rotation, so that the skewing forces on the envelopes are canceled out.

From the foregoing description, it can be seen that if the stacker 10 is overfilled, the envelopes 35 will start to spill over the top of the guide walls 14 and 16 and the end wall 18, but the envelopes 35 will not be damaged or back up into the previous processing unit (current stackers are prone to cause jams when overfilled). When used with inserters and mailing machines, the stacker 10 improves sealing, because the full weight of the accumulated stack 34 is applied to the last fed envelope 35. Alternatively, the stacker 10 can easily be designed to delay contact between successive envelopes 35. By adding additional turns to the helix 32, several envelopes 35 can be held separated before adding them to the bottom of the stack 34, each envelope 35 in its own turn of the helix 32. This is useful in any printing application, where the drying time for the ink is extended. This advantage, and the fact that successive envelopes do not wipe over each other, can eliminate ink smears.

Although the foregoing description has been based on the workpiece being envelopes, the instant invention can be used in connection with any paper documents.

It should be understood by those skilled in the art that various modifications may be made in the present invention without departing from the spirit and scope thereof, as described in the specification and defined in the appended claims.

What is claimed is:

1. A stacker for stacking paper documents seriatim, comprising:

a platform;

a single, open helix extending upwardly from said platform, said helix having a vertical, longitudinal axis and enclosing an open space;

means for rotating said helix, whereby a paper document placed at the bottom of said helix can be driven upwardly to the top of said helix;

a guide wall extending upwardly from said platform to restrain said paper document when said helix is rotating; and an end wall extending upwardly from said platform and secured to said guide wall, said end wall extending from the back of said platform and including an angled, stepped section to further restrain said paper document when said helix is rotating, wherein said stepped section includes a plurality of vertically extending sections offset with respect to each other.

2. The stacker of claim 1, wherein said rotating means includes a motor located below said platform, and a drive shaft operatively connected to said helix.

3. The stacker of claim 2, additionally comprising a first and a second limit switch to control activation of said motor.

4. The stacker of claim 3, wherein the first limit switch is located at the bottom of the stacker and is normally open and becomes closed when a document is placed on the platform to thereby start said motor.

5. The stacker of claim 4, additionally comprising a cam fixedly secured to said drive shaft, said cam having a camming surface, wherein the second limit switch is engageable by said cam and is normally closed to provide power to said motor and is opened by said camming surface to thereby stop said motor.

6. The stacker of claim 5, wherein said helix contains two full turns.

\* \* \* \* \*